United States Patent
Kawabata et al.

(10) Patent No.: US 9,262,714 B2
(45) Date of Patent: Feb. 16, 2016

(54) FREQUENT PATTERN EXTRACTION APPARATUS FREQUENT PATTERN EXTRACTION METHOD AND PROGRAM

(71) Applicant: CANON KABUSHIKI KAISHA, Tokyo (JP)

(72) Inventors: Takayuki Kawabata, Kawasaki (JP); Fumiaki Itoh, Yokohama (JP); Haruo Yokota, Tokyo (JP); Yosuke Watanabe, Tokyo (JP); Qiang Song, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 13/733,796

(22) Filed: Jan. 3, 2013

(65) Prior Publication Data

US 2013/0179381 A1     Jul. 11, 2013

(30) Foreign Application Priority Data

Jan. 11, 2012    (JP) ................. 2012-003368

(51) Int. Cl.
- *G06F 17/00* (2006.01)
- *G06N 5/02* (2006.01)
- *G06F 17/30* (2006.01)

(52) U.S. Cl.
CPC ............ *G06N 5/02* (2013.01); *G06F 17/30144* (2013.01)

(58) Field of Classification Search
None
See application file for complete search history.

(56) References Cited

U.S. PATENT DOCUMENTS

| | | | |
|---|---|---|---|
| 8,447,705 B2 * | 5/2013 | Fujimaki et al. | 706/12 |
| 2007/0162907 A1 * | 7/2007 | Herlocker et al. | 718/100 |
| 2011/0125679 A1 * | 5/2011 | Brdiczka | 706/12 |

FOREIGN PATENT DOCUMENTS

| | | |
|---|---|---|
| JP | 3860602 B2 | 12/2006 |
| JP | 2009-211385 A | 9/2009 |

OTHER PUBLICATIONS

Song, Qiang, et al. "A file recommendation method based on task workflow patterns using file-access logs." Database and Expert Systems Applications. Springer Berlin Heidelberg, 2013.*

* cited by examiner

*Primary Examiner* — Jeffrey A Gaffin
*Assistant Examiner* — David H Kim
(74) *Attorney, Agent, or Firm* — Canon USA, Inc., IP Division

(57) ABSTRACT

There is provided a frequent pattern extraction apparatus. In the apparatus, time series data for an item operation is divided into a plurality of item operation sets. Using a set degree of similarity between the item operation sets, an abstract item operation set is generated. A pattern of sequences that frequently appear is extracted from the sequences in the abstract item operation set. Using the pattern of sequences that frequently appear, an item as well as an item operation are recommended to a user.

10 Claims, 24 Drawing Sheets

FIG.5

| 501 | 502 | 503 | 504 | 505 |
|---|---|---|---|---|
| LOG ID | TIME | USER ID | FILE ID | OPERATION EVENT |
| 45165 | 2010-06-09T05:00:15 | 1000 | 1544345 | open |
| 45166 | 2010-06-09T05:00:29 | 1000 | 4245646 | print |
| 45167 | 2010-06-09T05:05:29 | 2000 | 1235466 | open |
| 45168 | 2010-06-09T06:00:29 | 2000 | 1476325 | open |
| 45169 | 2010-06-09T06:00:46 | 1000 | 2335486 | open |
| 45170 | 2010-06-09T06:10:29 | 4685 | 2443585 | update |

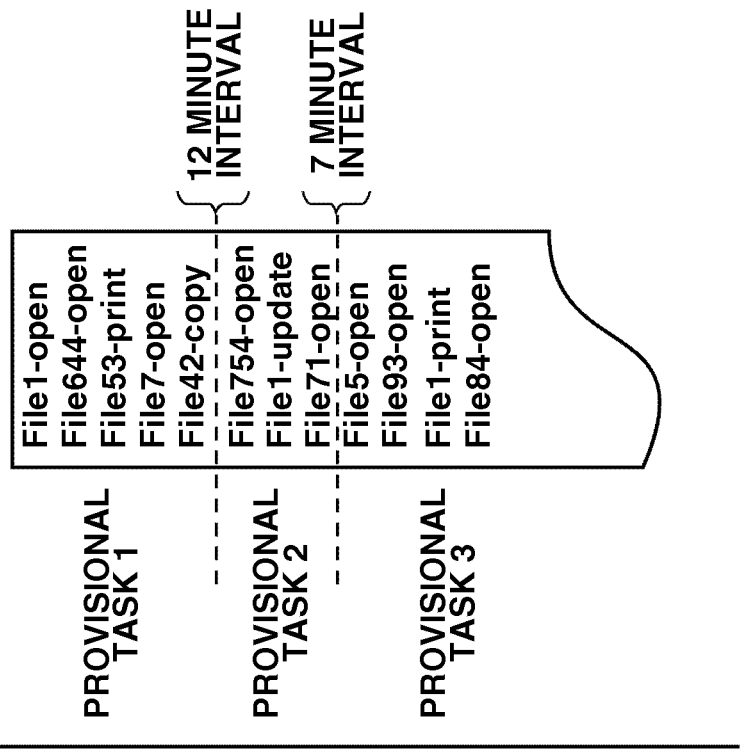
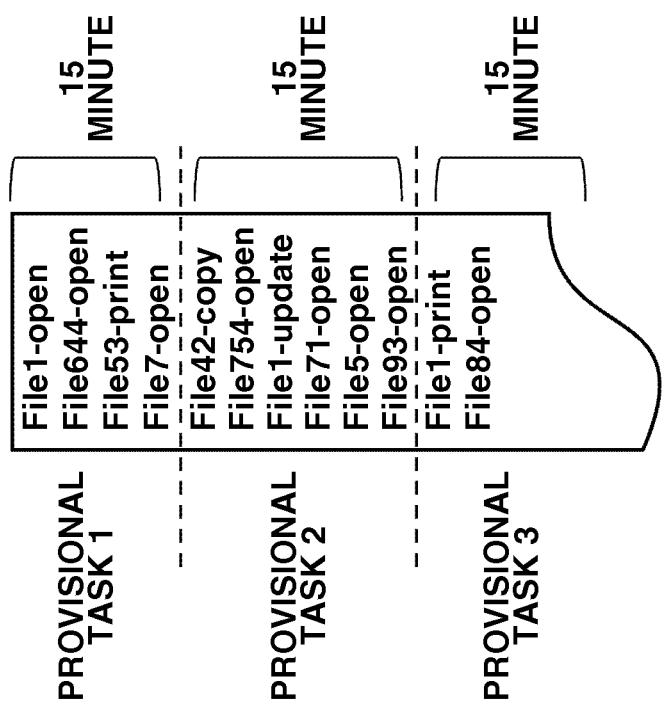
FIG.8A
FIG.8B

|        | File1 | File11 | File12 | File111 | File121 | File122 |
|--------|-------|--------|--------|---------|---------|---------|
| File1  | 1     | 0.9    | 0.9    | 0.81    | 0.81    | 0.81    |
| File11 | —     | 1      | 0.81   | 0.9     | 0.73    | 0.73    |
| File12 | —     | —      | 1      | 0.73    | 0.9     | 0.9     |
| File111| —     | —      | —      | 1       | 0.66    | 0.66    |
| File121| —     | —      | —      | —       | 1       | 0.81    |
| File122| —     | —      | —      | —       | —       | 1       |

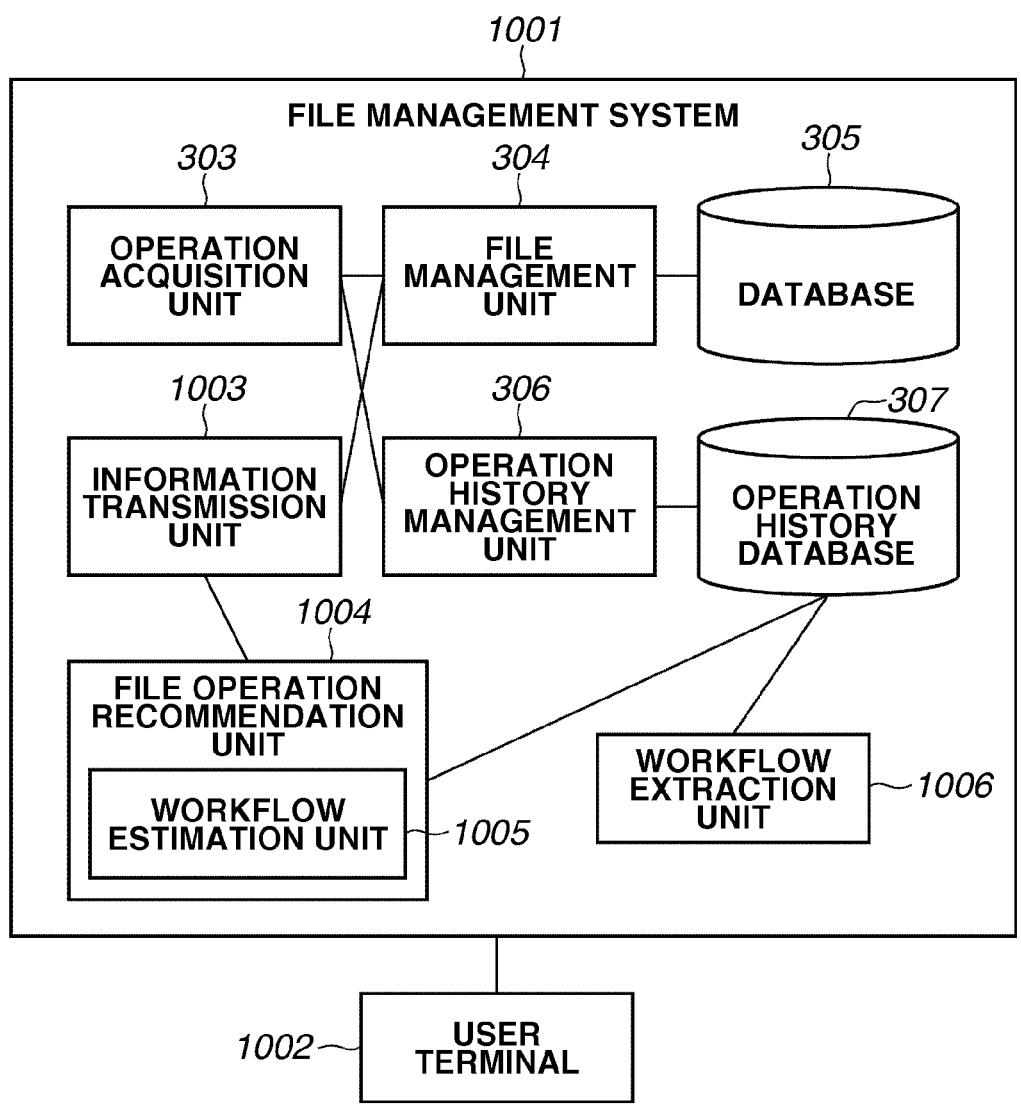

PROVISIONAL TASK 1
(FILE UNITS)

File1-open
File644-open
File53-print
File7-open
File42-copy

PROVISIONAL TASK 1
(FILE CLUSTER UNITS)

FC1-open
FC56-open
FC5-print
FC48-open
FC83-copy

| PROVISIONAL WORKFLOW ID | TASK SEQUENCE |
|---|---|
| 1 | TASK 1, TASK 2, TASK 3 |
| 2 | TASK 1, TASK 4, TASK 2, TASK 3 |
| 3 | TASK 2, TASK 4, TASK 1 |
| 4 | TASK 1, TASK 1, TASK 4 |

~1901

MINIMUM SUPPORT VALUE = 2

| WORKFLOW ID | TASK SEQUENCE | SUPPORT VALUE |
|---|---|---|
| 1 | TASK 1, TASK 2, TASK 3 | 2 |
| 2 | TASK 1, TASK 4 | 2 |

~1902

FREQUENT PATTERN EXTRACTION APPARATUS FREQUENT PATTERN EXTRACTION METHOD AND PROGRAM

BACKGROUND OF THE INVENTION

1. Field of the Invention

The present invention relates to a method for extracting a characteristic frequent pattern using a user's item operation history, and a method for recommending an item as well as an operation for that item to a user using that extraction method.

2. Description of the Related Art

Examples of conventional methods for a user to search for a desired item include a method in which matching is performed based on a keyword and a method in which the layers of a categorized and hierarchical item are narrowed down by selection. However, these conventional methods place a large burden on the user, and in a worst-case, depending on a user's technical level, a desired item may not be found. Thus, to reduce the user's workload, recommendation methods have been proposed that automatically search for necessary items and present the results to the user.

An example of a well-known recommendation method is collaborative filtering, which is widely used in the electronic commerce site (EC site). This method extracts similar users who have similar usage trends of an item based on the past usage history, and predicts an item to recommend using the usage history of those similar users.

However, desired items in an office are not only information used as an information resource for creating information, such as internal company documents and Web documents. Sought-after items may also be information about a procedure for achieving predetermined work, a method for efficiently proceeding with work, or some kind of know-how. Although it is desirable if such information is organized based on experience and explicitly stated as a workflow, if such information is not explicitly stated, a person has to spend time and effort to search for the information by asking somebody who is likely to know or learn for himself/herself through trial and error.

Accordingly, various technologies have been proposed to extract a partial data sequence that frequently appears from a usage history arranged in time series (sequential pattern mining), and utilize that partial data sequence as a recommendation for a characteristic pattern. For example, by analyzing a Web access log and extracting patterns such as page F is often viewed after page A is viewed, a recommendation can be made to a user who has viewed page A to then view page F. Thus, in cases in which the order of item usage is important, this type of recommendation method is widely proposed.

Japanese Patent No. 3860602 discusses services and information that have been specialized for an operator by extracting a frequent operation pattern from an operation history of one or more devices (mainly household appliances), and estimating who the operator is. A temporal set of an operation is referred to as an element. An operation that frequently appears among elements is extracted as a frequent operation pattern.

Further, a technology that searches for past jobs that are the same as the job currently being performed by using a usage history, and makes a recommendation based on the search result has also been proposed. Japanese Patent Application Laid-Open No. 2009-211385 discusses a technology in which a document previously used for a job and the usage state and edited content of the document in that job are stored as a job record, which is used to make a related document recommendation to the user. A highly accurate recommendation about related information that matches the job objective is made by extracting similar jobs in the past based on a degree of similarity of the operation content with the user's current document, and extracting the document used for that job. The analogy with past similar jobs is determined based on a degree of similarity of the operation content on a document whose document ID matched.

The basic methods for making such a recommendation like the conventional methods are as follows.

1. Extracting a characteristic frequent operation pattern beforehand from a usage history.
2. Estimating which frequent operation pattern the operation currently being performed belongs to based on the most recent operation by the user.
3. Making a recommendation to the user regarding the next operation based on the estimated frequent operation pattern.

However, when considering document usage in an office, there is a large problem when extracting the characteristic frequent operation pattern. Typically, even if workflows have a document operation flow that is generally the same, when looked at carefully, the order of operations is often random, and the operation target file names are often different. In such a case, not only is it difficult to find a frequently appearing pattern, but there is a high likelihood that the extracted operation pattern is not very versatile.

For example, in a case of a workflow for creating a quotation, even if the general operation flow is the same for two users, user A and user B, there is a high likelihood that the document name of the quotation to be created will be different, that the names of documents opened for reference will be different, and that the order for opening those documents will be different. Although this example describes differences between users, even the same user often makes slight changes to the operation content from time to time. Thus, it can be considered that discovering exactly the same frequent operation pattern is difficult. Even supposing that such a pattern could be found, it is highly likely that the operation pattern is overly specialized, and thus its suitability for estimating a workflow for the user's operations is reduced.

SUMMARY OF THE INVENTION

According to an aspect of the present invention, a frequent pattern extraction apparatus includes an acquisition unit configured to acquire time series data for a data operation in user units from a data operation history database, a dividing unit configured to divide the time series data for the data operation into a plurality of data operation sets, a set degree of similarity acquisition unit configured to acquire a set degree of similarity among the data operation sets, a generation unit configured to generate an abstract data operation set from the plurality of data operation sets using the set degree of similarity, and an extraction unit configured to extract a pattern of sequences that frequently appear among sequences in the abstract data operation set.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a file operation log according to an exemplary embodiment.

FIGS. 8A and 8B illustrates provisional task extraction according to an exemplary embodiment.

FIG. 10 is an example of a block diagram according to a second exemplary embodiment.

DESCRIPTION OF THE EMBODIMENTS

Various exemplary embodiments, features, and aspects of the invention will be described in detail below with reference to the drawings.

An exemplary embodiment of a frequent pattern extraction method according to the present invention will now be described based on the drawings. In a first exemplary embodiment, a file having a folder (or a directory) structure serves as an item, and a frequent pattern extraction function is provided as a function in a file management system. However, although a file serves as the item in the present exemplary embodiment, the present invention is not limited to that. For example, for a device such as a digital camera or application software on a personal computer (PC), an operation menu or a setting can serve as the item. Thus, by applying the present invention, navigation of that operation can be effectively performed.

A system configuration according to the present exemplary embodiment will now be described with reference to FIG. 1. A file management system is realized as a client server model. A terminal A 102, a terminal B 103, a terminal C 103, and a file management server 105 are connected via a network 101, which allows various information to be exchanged among the respective devices. The user performs a file operation, such as file registration, viewing, deletion, printing, copying and the like, using a dedicated client tool on the terminal A 102, the terminal B 103, and the terminal C 104.

Figure 1:
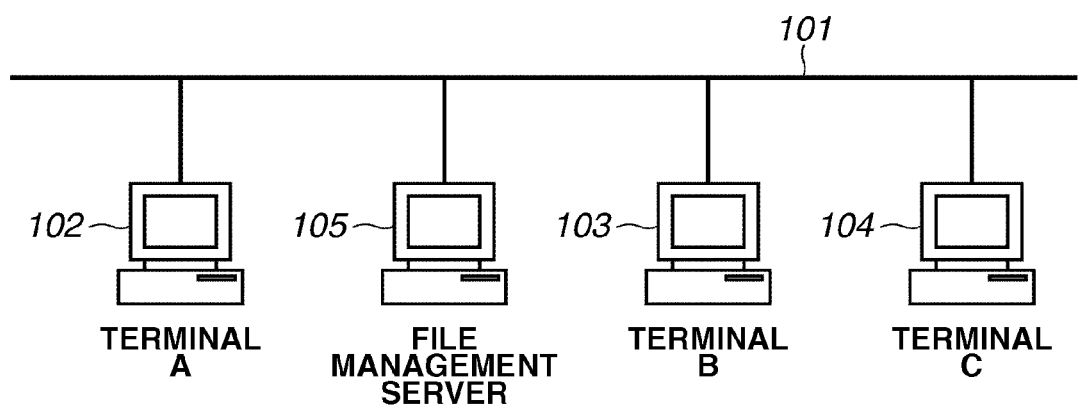
FIG. 1 illustrates a configuration example of a system according to a first exemplary embodiment.
Figure 2:
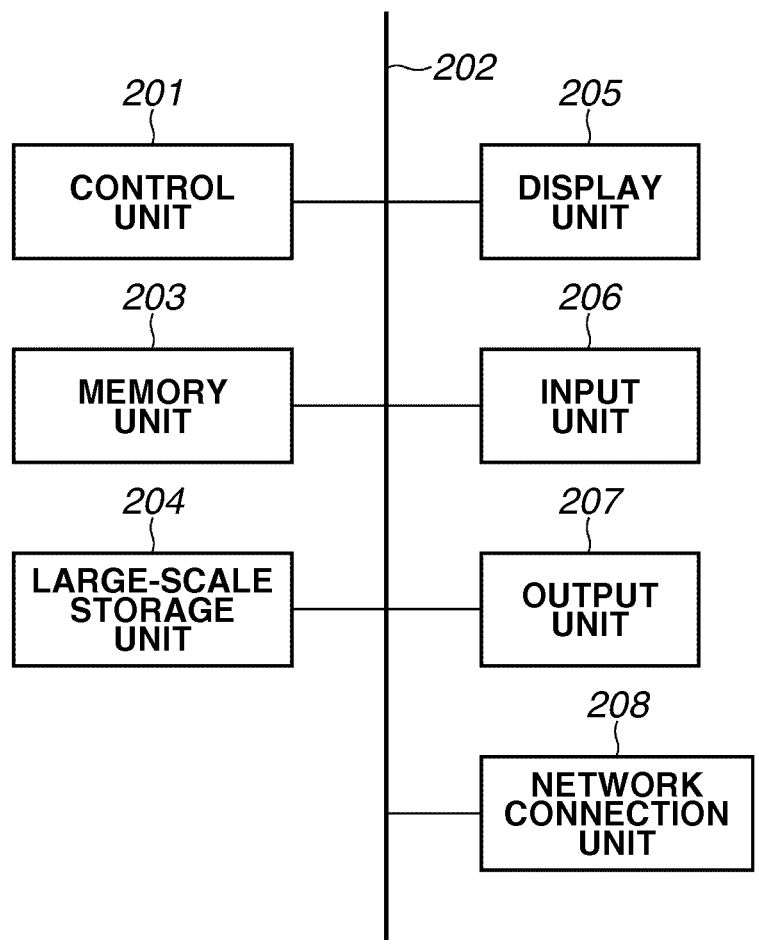
FIG. 2 illustrates a configuration example of an apparatus according to the first exemplary embodiment.

FIG. 2 illustrates a configuration example of the apparatuses illustrated in FIG. 1 for performing the processing according to the present invention. In FIG. 2, a control unit 201 is configured from a central processing unit (CPU), for example. The control unit 201 is connected to a memory unit 203, a large-scale storage unit 204, a display unit 205, an input unit 206, an output unit 207, and a network connection unit 208 via a bus 202. The memory unit 203 is an electronic storage device configured from a random access memory (RAM), for example. The control unit 201 operates based on programs and data stored in the memory unit 203, controls the respective connected units, and performs input/output of data. The large-scale storage unit 204 is a data storage apparatus, such as a hard disk or an optical disc. The display unit 205 is a display device for displaying documents, for example, to the user using the system.

The input unit 206 is a pointing device, such as a mouse, a stick, or a pad, for inputting instructions that are coordinated with the display content on the display unit 205. A device that combines the display unit 205 and the input unit 206, such as a display having a touch panel function, can be used. The output unit 207 is a printer device, for example, for outputting data on paper. The network connection unit 208 is a network interface for receiving data externally from the apparatus and transmitting data out of the apparatus. The units 201 to 208 illustrated in FIG. 2 may be configured as a stand-alone versatile computer, such as a PC, or configured in an electronic device such as a multifunction peripheral (MFP). Further, these units 201 to 208 may also be configured from a set of a plurality of computers and servers connected to each other, and peripheral devices such as displays and personal digital assistants (PDAs).

Figure 3:
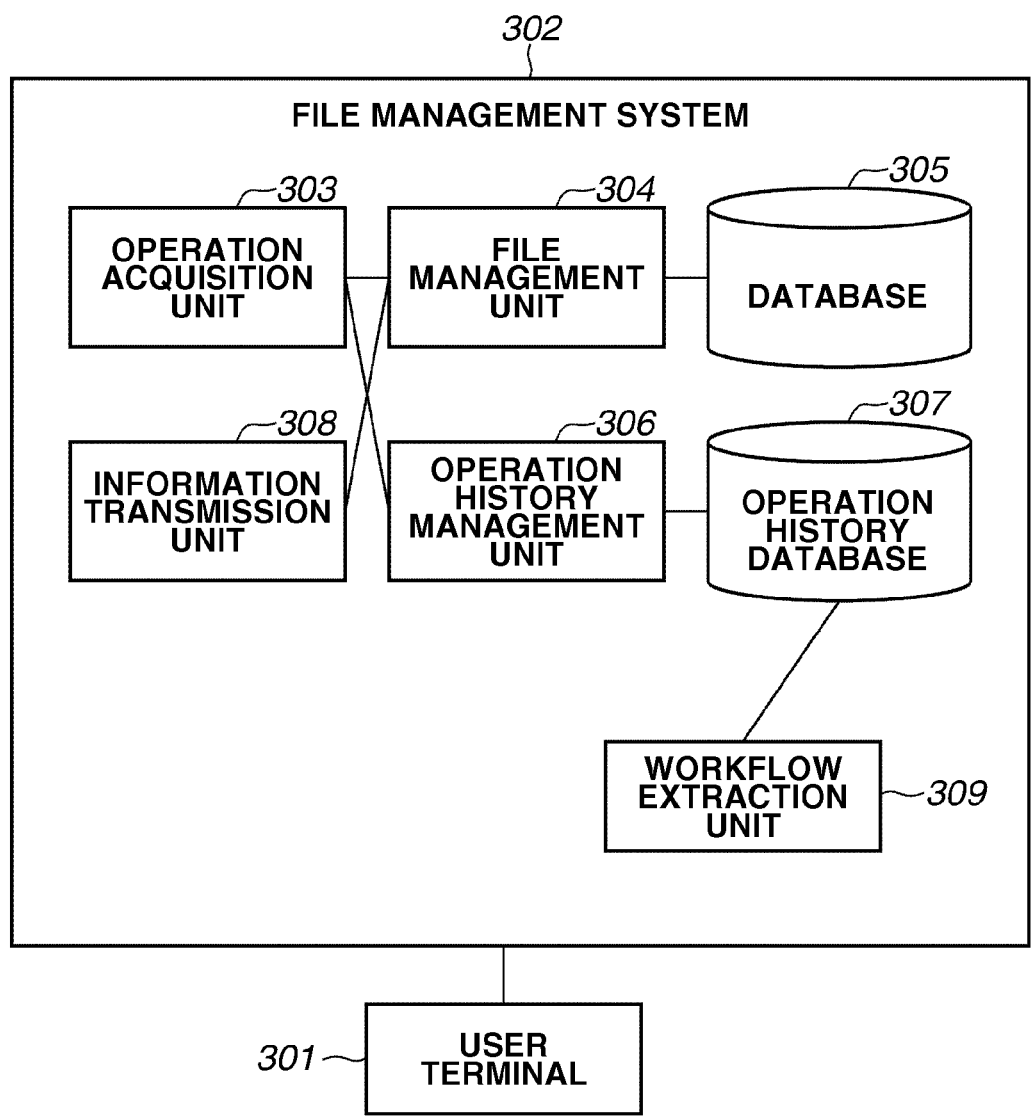
FIG. 3 is an example of a block diagram illustrating the blocks according to the first exemplary embodiment.

FIG. 3 is an example of a block diagram illustrating the blocks that perform the processing executed by the PC, for example, illustrated in FIG. 2. Blocks 303 to 309 are programs that are executed in coordination with units 202 to 208 by the control unit 201 illustrated in FIG. 2. In the present exemplary embodiment, a file management system 302 is provided in the file management server 105, and a (not illustrated) client tool is provided in a user terminal 301. The file management system 302 includes an operation acquisition unit 303, a file management unit 304, a database 305, an operation history management unit 306, an operation history database 307, an information transmission unit 308, and a workflow extraction unit 309, which is a characteristic feature of the present invention.

Next, each process will be described. Although in the present exemplary embodiment a workflow extraction function is incorporated in the file management system, the present invention is not limited to this. Each function may be executed by itself, or can be executed by incorporating it in another separate system. Further, although the present exemplary embodiment is described based on a client server model as the file management system, the present invention is not limited to this. Obviously, the present exemplary embodiment can also be executed by a stand-alone client.

The operation acquisition unit 303 receives file operation information input from a client tool on the user terminal 301, and transmits the file operation information to the file management unit 304 and the operation history management unit 306.

The file management unit 304 receives file operation information from the operation acquisition unit 303, and performs predetermined file operation processing in coordination with the database 305 based on the file operation information. The term "file operation" refers to, for example, an operation such as new registration of a file, opening, copying, deletion or an operation performed on a folder. The processing content of a file operation is the same as for a typical file management system. Information about the processing result is transmitted via the information transmission unit 308 to the user terminal 301, and is displayed in a client tool on the user terminal 301.

The database 305 stores and acquires information about the files and folders managed by the file management system 302, and information about the user using the file management system 302. This user information is not limited to information about only the user, such as a user name and user ID, but can also include information relating to a user group, such as groups that a user belongs to and a list of users who belong to a group. Since the details of the internal configuration of the database 305 are not pertinent to the gist of the present invention, a description thereof is omitted here.

The operation history management unit 306 receives file operation information from the operation acquisition unit 303, and stores the file operation information as a file operation history in the operation history database 307. FIG. 5 illustrates an example of file operation information registered as a file operation history. A log ID 501 is a symbol for uniquely identifying file operation information. Time information 502 indicates the time when a file operation was performed. A user ID 503 is information for identifying the user who performed a file operation. File ID information 504 is for identifying an operation target file. File operation event information 505 indicates the type of file operation event that was executed. However, the present invention is not limited to the file operation information described here, which is just an example.

Figure 4:
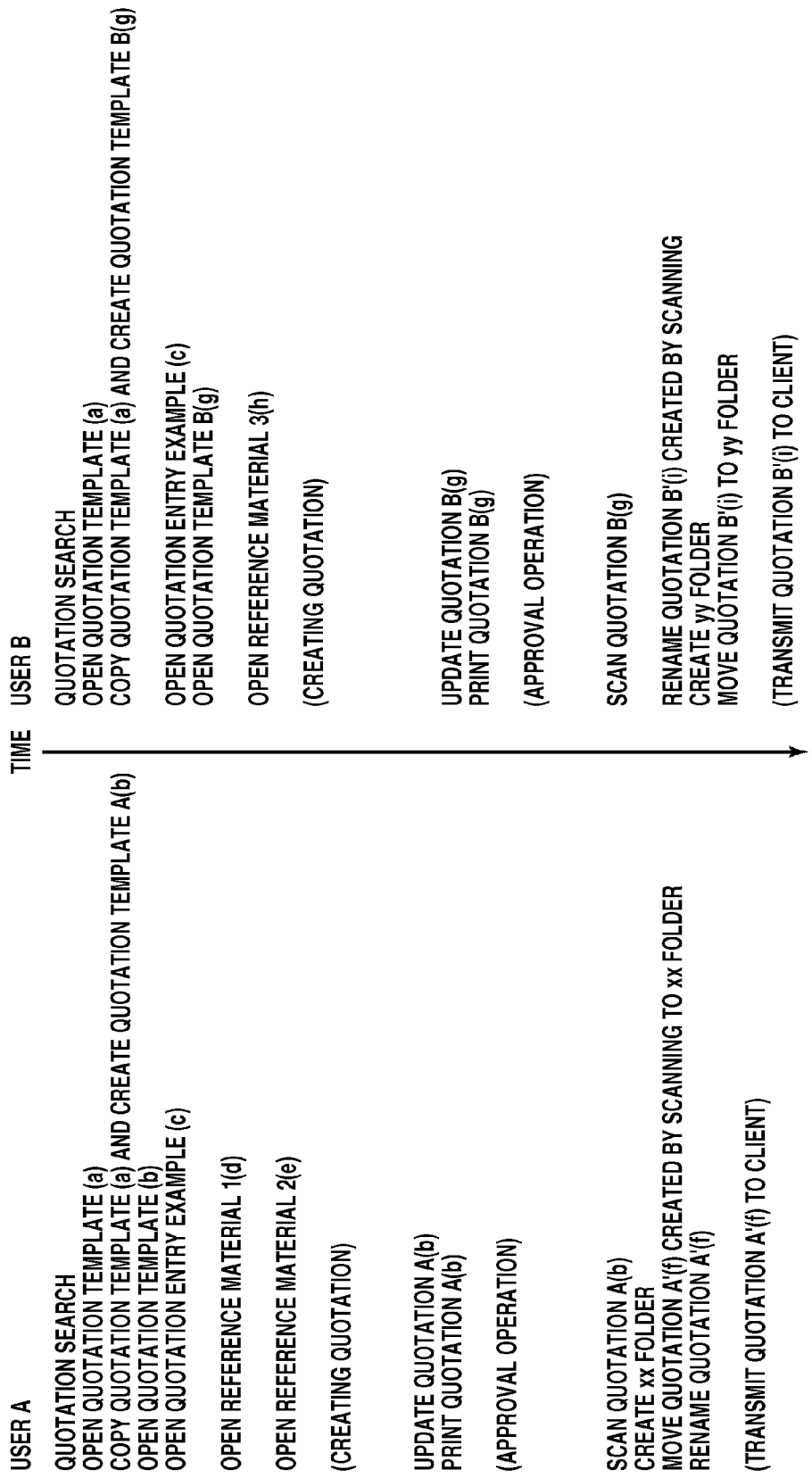
FIG. 4 illustrates a file operation history according to an exemplary embodiment.

The term "workflow" refers to a job flow that is performed to achieve a predetermined objective. A workflow is represented as a set of file operations. Basically, a workflow can be thought of as a sequential arrangement of file operations for extracting a frequent pattern of those operations. However, if a workflow is simply considered as a sequential operation pattern, not only will there be few patterns that frequently appear, with those patterns being difficult to find, but even if a pattern is found and extracted, there is a high likelihood that that workflow will not be very versatile. The reason for this is that even if work patterns in an office have a generally similar flow, when the individual operations are looked at carefully, the order of operations is often random, and the operation target files are often different. For example, FIG. 4 illustrates time series data of a file operation history example when users A and B created a quotation.

When looked at in terms of file operation units, the two workflows have the following differences in file operations, for example.

The file names of the quotations created by copying a template are different.

The files opened as a reference material are different.

For operations that do not differ in their result even if the order is changed, such as whether to rename a file and then move it or move a file and then rename it, the operation order is different.

Due to such differences, the sequential patterns of file operations for user A and user B are considered to be different. However, such differences are commonplace in office work. Thus, there is a need to assimilate such differences and interpret these to be the same workflow. Therefore, in the present invention, to assimilate minor differences based on file operation units, a meaningful predetermined set formed from a plurality of file operations is defined as a task, which is an abstract item utilization operation set. A workflow is a sequential arrangement of tasks formed from a sequence of abstract item utilization operation sets that frequently appear.

Next, the workflow extraction processing performed by the workflow extraction unit 309 will be described with reference to the flowchart of FIG. 6. This flowchart is realized by the control unit 201 executing a control program.

Figure 7:
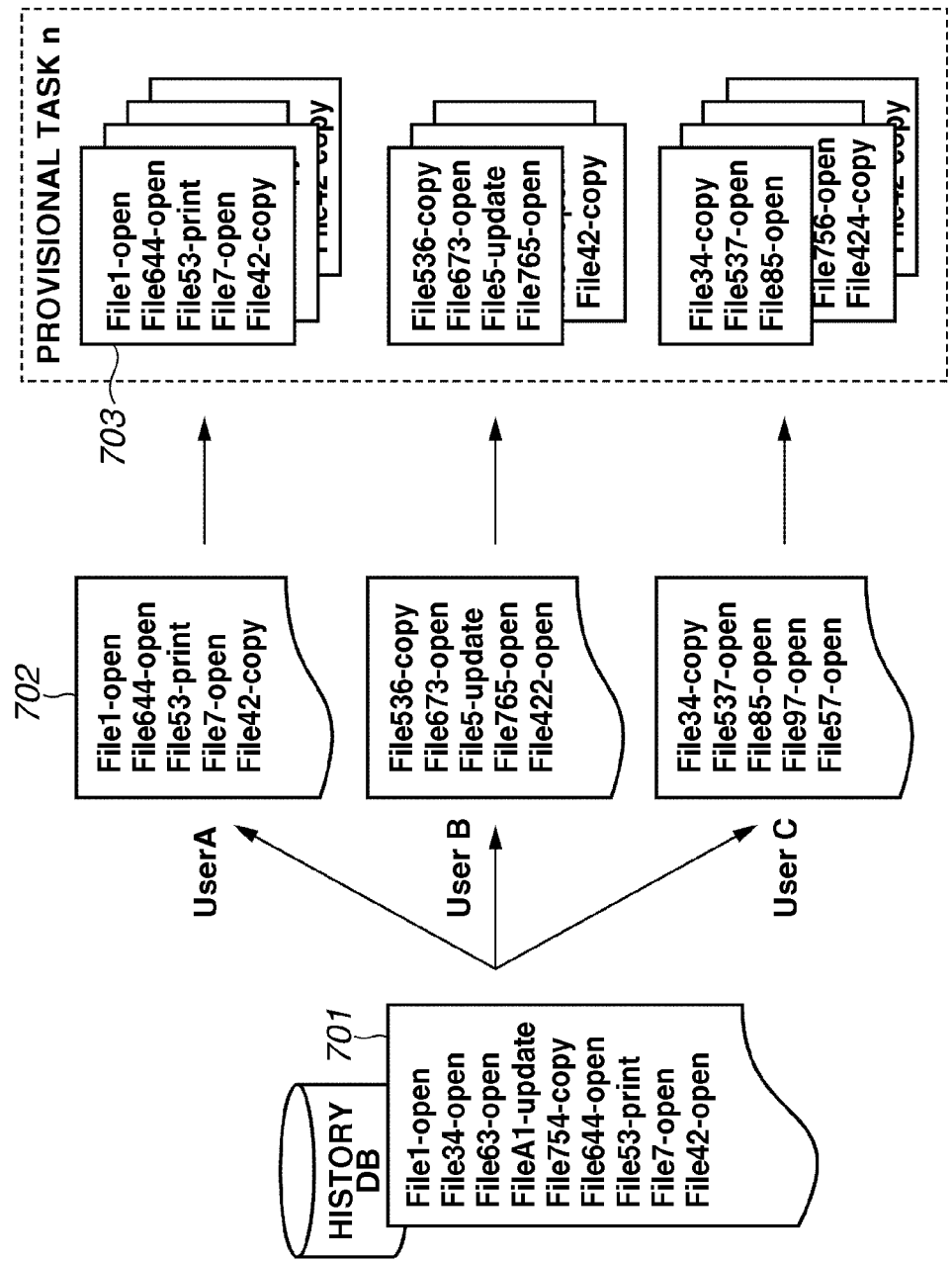
FIG. 7 illustrates provisional task extraction according to an exemplary embodiment.

First, the processing performed in steps S601 and S602 will be described with reference to FIGS. 7, 8A, and 8B. A file operation history 702 for each user is cut from the file operation history 701 illustrated in FIG. 7. Using a predetermined division index, this file operation history 702 is divided into groups of file operations that were recently performed (these groups are referred to as a provisional task 703) to generate a provisional task set, which is an item utilization operation set.

The predetermined division index may be, for example, a method for dividing into fixed time intervals, or a method for dividing locations where the time between file operations is longer than a predetermined fixed duration. For example, as illustrated in FIG. 8A, the provisional task may be generated by dividing a log at fixed 15 minute time intervals, or as illustrated in FIG. 8B, the provisional task may be generated by dividing at a location where the time between file operations is 5 minutes or longer. Further, this division can be performed based on a specific file operation, such as file check out/check in, or based on a job division expressly input by the user.

In step S602, the degree of similarity between files (item similarity) is calculated. The degree of similarity between files does not simply employ the degree of similarity of document content as an index, it employs an index that views files that are used in a similar manner in a job to have a higher degree of similarity. For example, an index like the following may be utilized.

File copy relationship
File structure information (XML structure)
File co-occurrence frequency information
File attribute information The degree of similarity of the respective indices may be used alone or by combining a plurality together, as necessary. Further, the degree of similarity is not limited to these examples. The method for calculating the degree of similarity between files for each of the indices will be described in detail below.

A degree of similarity between files based on a file copy relationship will now be described. For example, for a file A and a file B created by copying a predetermined template, there is a high likelihood that file A and file B were used for jobs with the same objective. Based on such estimation, the degree of similarity between files can be defined utilizing a file copy relationship (copy history).

Figures 9A, 9B:
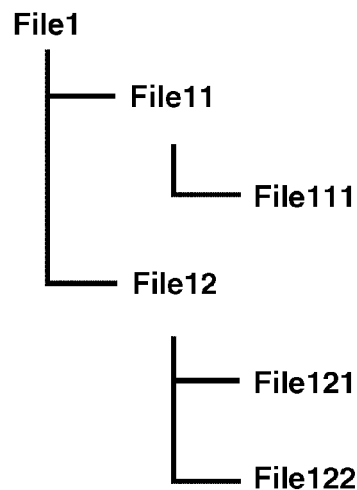
FIGS. 9A and 9B illustrate a degree of similarity between files based on a file copy relationship according to an exemplary embodiment.

In a simple method, for example, if files having a copy relationship are expressed as a tree structure like that illustrated in FIG. 9A, the degree of similarity between a predetermined file and another file can be determined by setting the degree of similarity of the predetermined file as 1, and multiplying that degree of similarity by an attenuation coefficient that decreases each step further away from the predetermined file. For the copy relationship illustrated in FIG. 9A, the degree of similarity between respective files when the attenuation coefficient is set at 0.9 is as illustrated in FIG. 9B. For example, since File 111 is a file created by copying File 11, which was itself created by copying File 1, the degree of similarity between File 1 and File 111 is 1×0.9×0.9=0.81.

Next, a degree of similarity between files based on structure information (XML structure) about a file will be described. Recently, many document files have changed from their own proprietary format to an extensible markup language (XML) format. A characteristic of the XML format is that tags are attached to the document content to facilitate processing for separating the structure and the content of the document. Thus, regardless of the document content among the document files, it is easy to search for documents having a similar structure. For example, for a file A and a file B created from the same template, although the document contents are different, since the document structures inherited from the same template are similar, the degree of similarity based on document structure acts as an effective index.

Next, a degree of similarity between files based on file co-occurrence frequency information will be described. For example, if there is a high probability that File 1, File 2, and File 3 are used together, and if there is a high probability that a separate File 10 is also used together with File 2 and File 3, then it can be estimated that File 1 and File 10 are used in a similar manner for jobs having the same objective. Based on such estimation, a degree of similarity between files can be defined using file co-occurrence frequency information. As a simple method for calculating the degree of similarity, the number of co-occurring files common between two files is divided by the average of the number of co-occurring files of each file. The term "common co-occurring file" does not only refer to identical files, similar files may also be included.

Lastly, a degree of similarity between files based on file attribute information will be described. Examples of information that is effective in calculating the degree of similarity between files include file names and path names. Jobs having the same objective tend to have commonalities in their file name. Often only a part of the filename is different. Examples of such a case include the minutes taken during a meeting, for example, in which the difference between file names is the date. For a type of investigation, the difference between file names may be the user name. Thus, files that show commonalities in their file names can be considered to have a high degree of similarity between files.

For example, if a degree of similarity between file A and file B based on file name is sim(file A, file B), then sim(file A, file B) can be simply defined as follows.

$$\text{sim}(fileA, fileB) = \frac{\text{len}(LCS(fileA, fileB))}{\min(\text{len}(fileA), \text{len}(fileB))} \quad (1)$$

In the above formula, len(file A) represents the length of the file name of file A, and min (len(file A), len (file B)) represents the length of whichever of file A or file B that has the shorter file name. Further, LCS(file A, file B) represents a longest common subsequence (LCS) between the file name of file A and the file name of file B. A subsequence is a sequence obtained by extracting several elements from a sequence. A common subsequence between two sequences is referred to as a common subsequence. Among the common subsequences, the longest subsequence is referred to as the longest common subsequence.

As another example of degree of similarity based on file names, a value indicating how different two character strings are in an information theory, called edit distance, can also be used. Specifically, the degree of similarity can be calculated as the minimum number of procedures required to change one character string to another character string by inserting, deleting, or substituting characters.

In the above, methods for calculating the degree of similarity between files based on four indices have been described.

Figure 11:
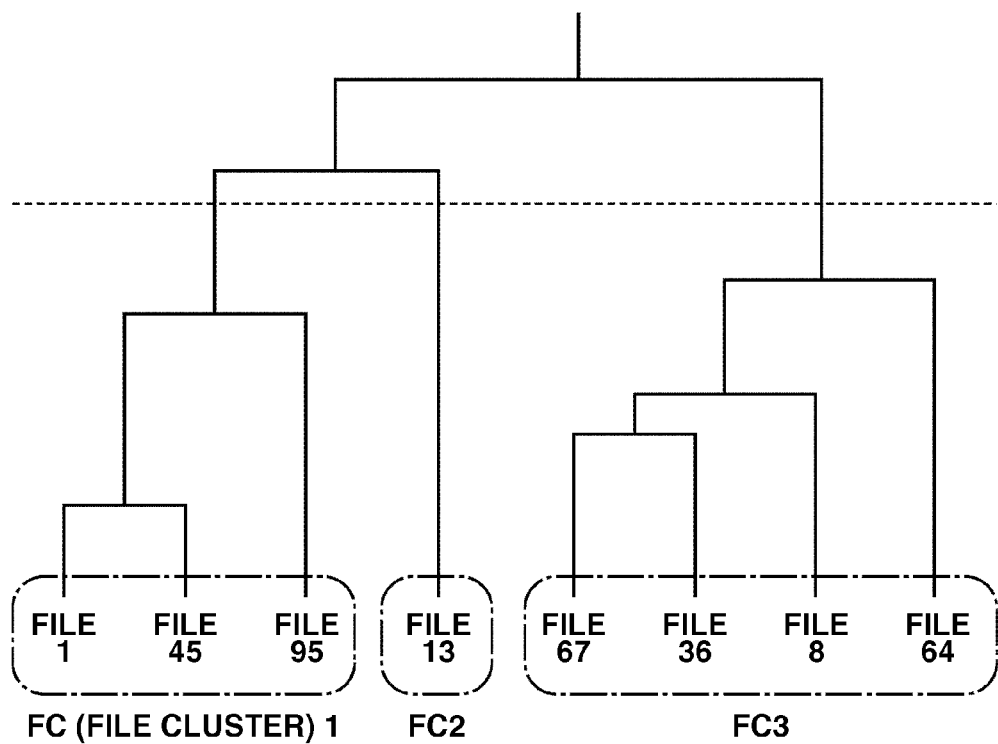
FIG. 11 illustrates a hierarchical cluster of files according to an exemplary embodiment.

In step S603, files are clustered using the degree of similarity between files calculated in step S602. Although clustering methods can be broadly broken down into hierarchical type and non-hierarchical type methods, in the present exemplary embodiment, a hierarchical type clustering method that does not require the number of clusters to be predetermined will be used. Examples of representative hierarchical type clustering methods include a shortest distance method, a longest distance method, a group average method, and Ward's method, any of which may be used. Since a description of each of these methods is not pertinent to the gist of the present invention, such a description thereof is omitted here. Step S603 results in a set obtained by grouping files that are used in a similar manner in a job being output as a file cluster. A file cluster is a set of one or more files. Even a file that is not similar to any other files can form a file cluster by itself. FIG. 11 illustrates an example of a file cluster (FC) generated by hierarchical type clustering. In FIG. 11, FC1 is a file cluster that includes file 1, file 45, and file 95, and FC2 is a file cluster that includes only file 13.

Figure 12:
FIG. 12 illustrates provisional task abstraction according to an exemplary embodiment.

In step S604, for the provisional task generated in step S601, the files in the file operation group forming the provisional task are replaced with the file cluster in which those files are included using the file cluster output in step S603. This is referred to as provisional task abstraction. An example of the specific processing will be described with reference to FIG. 12. The left side in FIG. 12 represents the provisional task generated in step S601, and the right side is a provisional task in which files have been replaced with a file cluster based on the processing of step S604. For example, since File 1-open, which is the first element in provisional task 1, is included in FC 1 generated in step S603, File 1-open is replaced with FC 1-open. Following that, all of the elements in the provisional task are replaced with the file cluster in which those files are included to generate a provisional task like that on the right side of FIG. 12.

In step S605, a set degree of similarity between provisional tasks is calculated using the provisional tasks of the file cluster units generated in step S604. The set degree of similarity between provisional tasks uses a degree of match between the elements in the file cluster operation set included in the provisional task as a degree of similarity index. Known examples of such a set degree of similarity index include, for example, the Jaccard coefficient, Dice's coefficient, and the Simpson coefficient. In all of these coefficients, the numerator is the number of matching elements between sets. However, the denominator is different, being the sum of the number of elements between two sets, the average number of elements, and the number of elements of the smaller set, respectively. Each degree of similarity is a value of 0.0 to 1.0.

Figure 13:
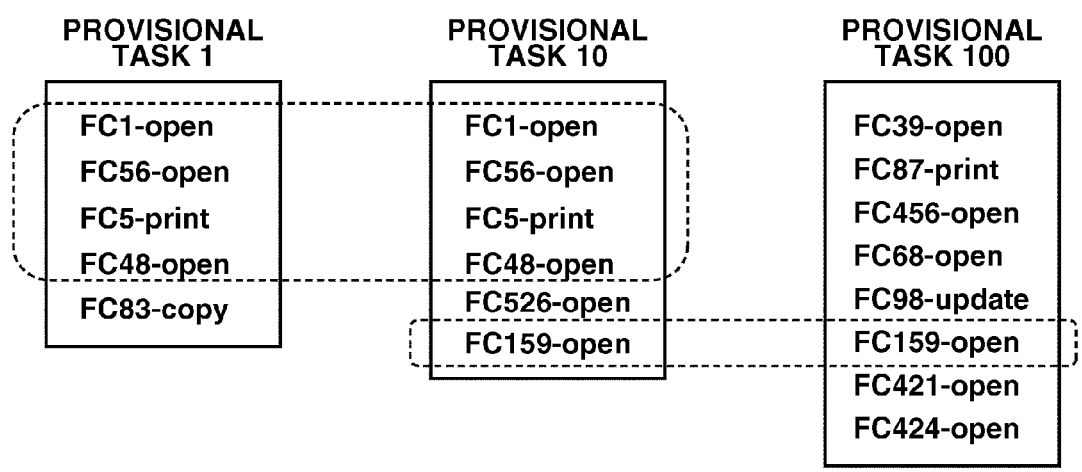
FIG. 13 illustrates calculation of a degree of similarity between files according to an exemplary embodiment.

For example, the degree of similarity obtained using Simpson's coefficient between the provisional task 1 and the provisional task 10 illustrated in FIG. 13 is ⅘=0.8. Similarly, the degree of similarity obtained using Simpson's coefficient between provisional task 10 and provisional task 100 is ⅙=0.17, so that it can be determined that provisional task 10 is more similar to provisional task 1 than provisional task 100.

In this calculation, the abstraction of files into a file cluster formed from files that are used in a similar manner in a job performed in step S604 works effectively. Even if a job with the same objective is performed, the files handled in that job may be different each time the job is performed. Consequently, if the degree of similarity between tasks based on file units is measured, the degree of similarity between files decreases despite the fact that the job has the same objective. To avoid such a situation, it is desirable to perform abstraction by grouping files that are used in a similar manner in a job.

In step S606, the provisional tasks are clustered using the degree of similarity between tasks calculated in step S605. Since the clustering processing method is the same as that for the file clustering performed in step S603, a description thereof is omitted here.

In step S607, task extraction is performed using the provisional task cluster created in step S606. The tasks are extracted one by one from the created provisional task cluster. This extraction can also be performed by extracting only tasks from a provisional task cluster in which the number of provisional tasks included in the provisional task cluster is equal to or more than a threshold. If the number of provisional tasks included in the provisional task cluster is large, this means that those tasks are frequently performed, and can thus be said to be versatile. Conversely, if the number of provisional tasks is small, they may not be very versatile, and are probably not important as tasks.

The elements of the file operations expressing a task can be determined from the elements of the file operations that the provisional tasks included in the provisional task cluster have. An example of determining the elements of a file operation expressing a task will be described with reference to FIGS. 14A and 14B.

Figure 14A:
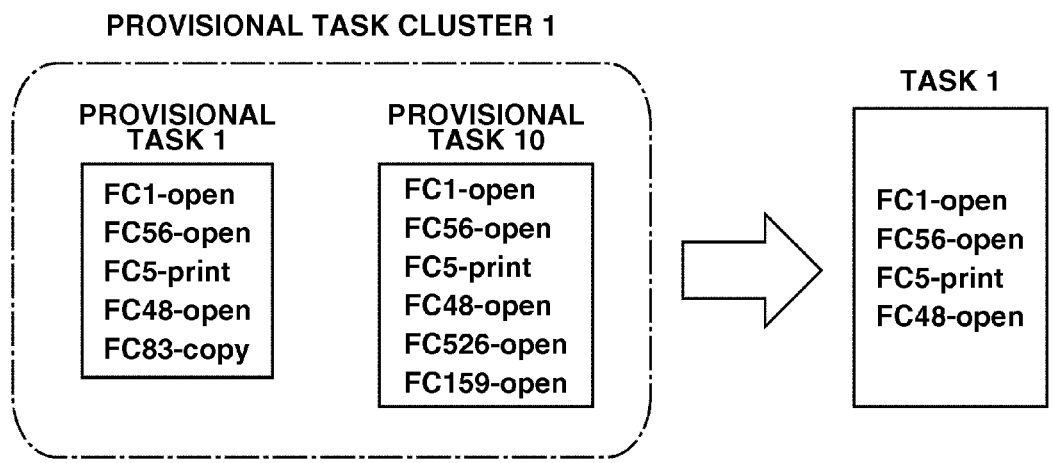
FIGS. 14A and 14B illustrate task generation according to an exemplary embodiment.

FIG. 14A illustrates an example in which a provisional task 1 and a provisional task 10 are included in a provisional task cluster 1, from which a task 1 is generated. The file operation elements expressing task 1 are a sum set of the file operation elements of the provisional task 1 and the provisional task 10. Therefore, file operation elements expressing the task can be taken as file operation elements commonly held by all of the provisional tasks included in the provisional task cluster, or can be taken as the file operation elements that are included in a predetermined number of provisional tasks or a predetermined ratio of provisional tasks.

Figure 14B:
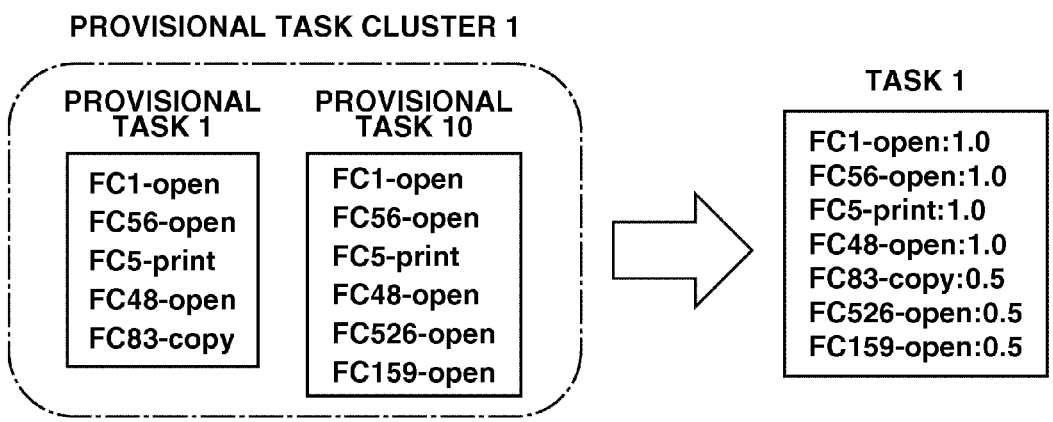

In addition, as illustrated in FIG. 14B, for each file operation, an appearance ratio can be calculated by dividing the number of provisional tasks including that file operation by the total number of provisional tasks included in the provisional task cluster, so that a task can be expressed by elements set with a file operation and an appearance ratio. Obviously, this can also be performed by setting a threshold for the appearance ratio, and narrowing down to only those file operations with an appearance ratio equal to or more than the threshold.

In step S608, extraction of a provisional workflow, which is a sequence of abstract item utilization operation sets in which tasks are sequentially arranged, is performed. An example of provisional workflow extraction will be described with reference to FIGS. 16A, 16B, and 17.

Figure 16A:
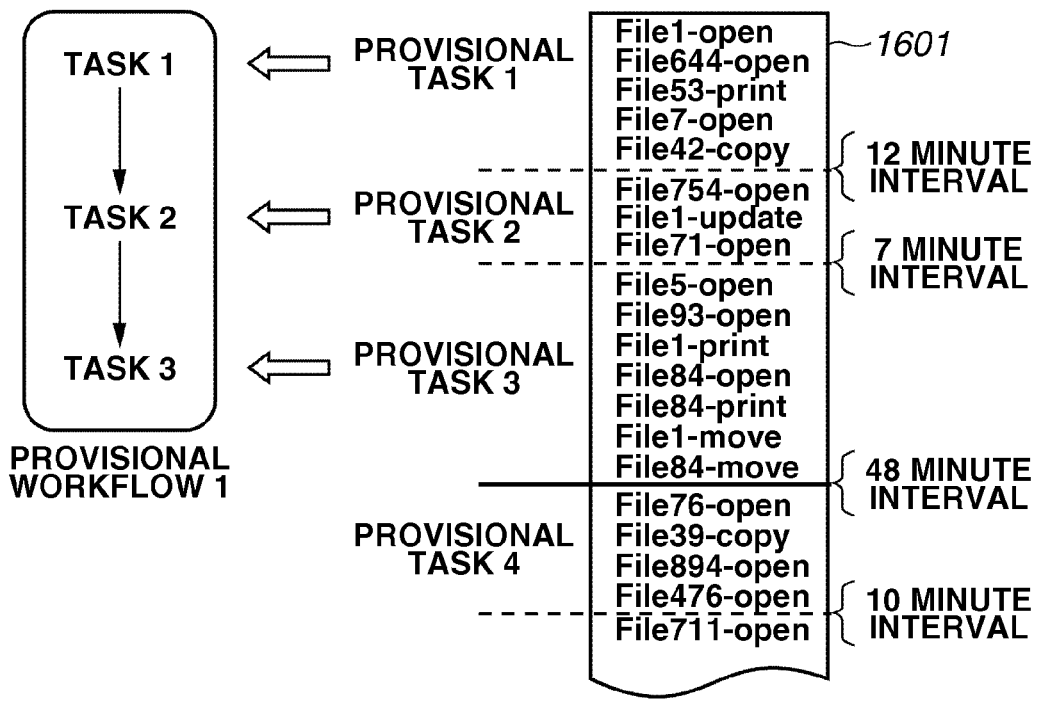
FIGS. 16A and 16B illustrate provisional workflow extraction according to an exemplary embodiment.

Provisional tasks are extracted in step S601 from the file operation history 1601 of a given user illustrated in FIG. 16A. The provisional workflow extraction is performed by dividing into provisional tasks based on a given condition. For example, in FIG. 16A, the provisional tasks are divided based on a temporal condition. In this example, division is performed if there is an interval of 30 minutes or more between provisional tasks, so that division is performed between provisional task 3 and provisional task 4, between which there is a 48 minute interval.

Next, the sequence of provisional task 1→provisional task 2→provisional task 3 obtained based on dividing is converted into a task sequence by replacing the provisional task sequence with the tasks extracted in step S607. In this example, by replacing provisional task 1 with task 1, provisional task 2 with task 2, and provisional task 3 with task 3, the provisional task sequence is converted into the task sequence task 1→task 2→task 3. The thus-obtained task sequence is extracted as a provisional workflow.

In FIG. 16A, although division between provisional tasks was performed based on a temporal condition, the present invention is not limited to this. In a division method that is based on a temporal condition, care needs to be taken because situations can arise when a recess, a meeting or the like occurs during the middle of a job.

Figure 16B:
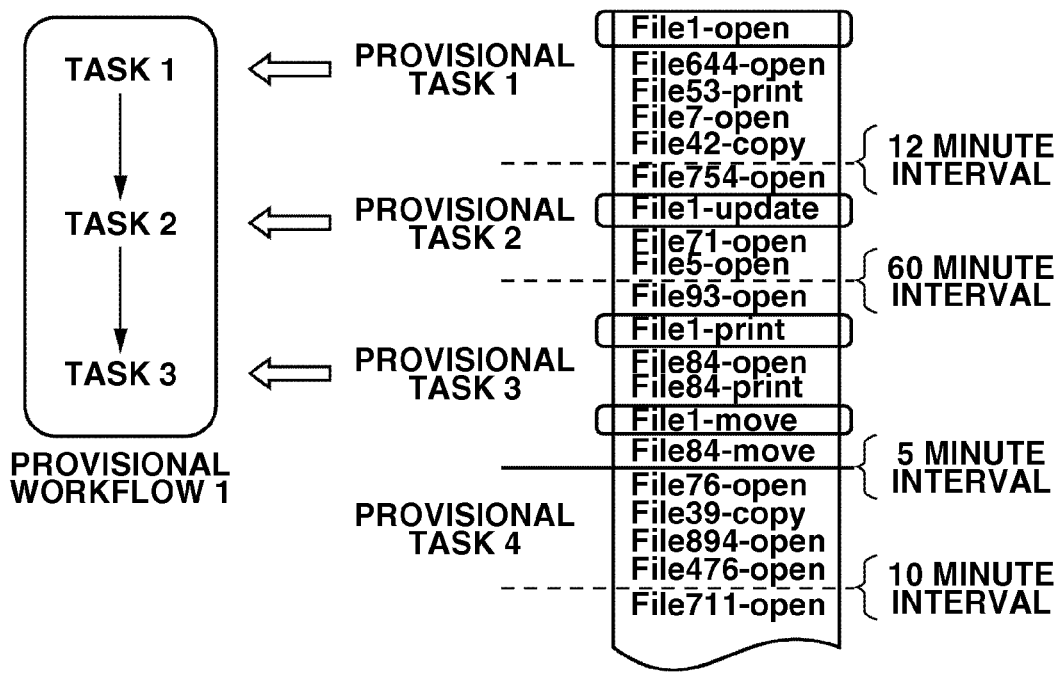

As another example, FIG. 16B illustrates a case in which the provisional tasks are divided at a location where there is no common files between the provisional tasks. Provisional task 1, provisional task 2, and provisional task 3 include an operation for File 1, so that it can be inferred that these provisional tasks relate to jobs having the same objective.

Since there are no common files between provisional task 3 and provisional task 4, provisional task 3 and provisional task 4 are inferred to relate to jobs having different objectives. Therefore, a division is performed between these provisional tasks.

After the division between these provisional tasks is performed, the flow until extraction of the provisional workflow is as described above with reference to FIG. 16A. Obviously, the provisional workflow can also be extracted by combining this condition with a temporal condition.

Figure 17:
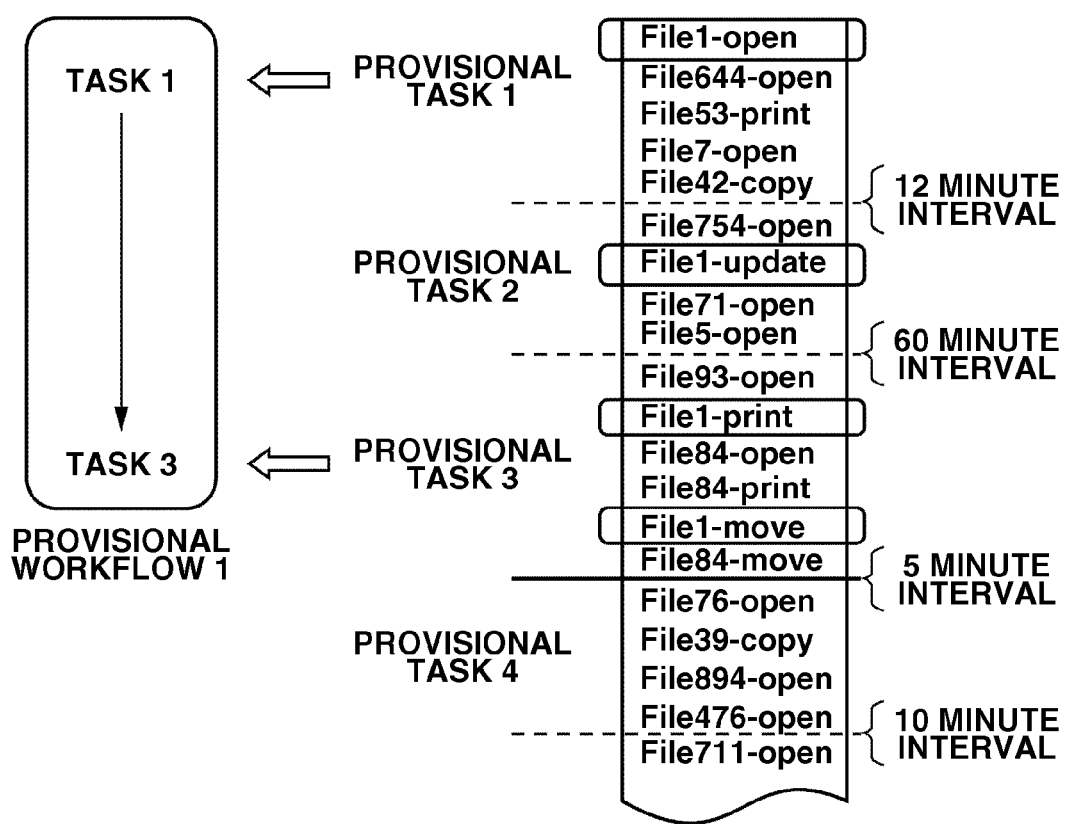
FIG. 17 illustrates provisional workflow extraction according to an exemplary embodiment.

Further, as illustrated in FIG. 17, for example, if there are no tasks that includes provisional task 2, the extracted provisional workflow 1 goes from task 1→task 3.

In step S609, sequential pattern mining is performed on the provisional workflow extracted in step S608 to find a task sequence that frequently appears. This task sequence is what is ultimately extracted as a workflow. Sequential pattern mining is processing defined as follows.

$I=\{i1, i2, \ldots in\}$ is set as an item set. A partial set in which set I is not empty is referred to as an element. Further, when a predetermined threshold $\xi>0$ is set, an item that appears $\xi$ times or more in set I is referred to as a frequent item. The order of the elements is referred to as a sequence. Further, for sequence $\alpha=(a1, a2, \ldots an)$ and sequence $\beta=(b1, b2, \ldots bn)$ when integer $1 \leq j1 < j2 < \ldots jn < m$ exist, which satisfy $a1 \subseteq bj1$, $a2 \subseteq bj2, \ldots an \subseteq bjn$, $\alpha$ is referred to as a subsequence of $\beta$, which is expressed as $\alpha \subseteq \beta$. $S=\{(sid1, s1), (sid2, s2), \ldots (sidn, sn)\}$, which is a set of sid of a sequence id and tuple (sid, s) of a sequence s, is referred to as a sequence database.

Further, support for the sequence $\alpha$ sequence data in the database S is defined as the number of tuples that include sequence $\alpha$ among all of the sequences in S. Sequences included in (sid, s) of a number of times that is equal to or more than the threshold $\xi$ (referred to as minimum support value) are referred to as a sequential pattern in the sequential database. Sequential pattern mining is processing that finds all of the sequential patterns in a sequential database S when the sequential database S and the minimum support threshold are set. Examples of representative sequential pattern mining methods include Apriori algorithm (Agrawal, R. and Srikant, R., "Fast Algorithms for Mining Association Rules", Proceedings of the 20$^{th}$ VLDB Conference, 1994, pp. 487 to 499), PrefixSpan (J. Pei, J. Han, B. Mortazvi—Asl, Q. Chen, U. Dayal, M. C. Hsu, "PrefixSpan: Mining sequential patterns efficiently by prefix-projected pattern growth", Proceedings of ICDE, 2001, pp. 215 to 224).

In the present exemplary embodiment, sequential pattern mining is applied with the items in the above description of sequential pattern mining as the tasks, the sequences as the provisional workflow, and the sequence database as the provisional workflow set. Further, the sequential pattern of tasks is extracted as the workflow, which is the ultimate objective of the processing.

Figure 19:
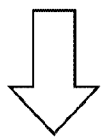
FIG. 19 illustrates workflow extraction according to an exemplary embodiment.

An example of extracting a workflow from a provisional workflow set will now be described with reference to FIG. 19. A provisional workflow set 1901 in FIG. 19 is formed from four provisional workflows. For example, a provisional workflow 1 is formed from a task sequence of task 1→task 2→task 3. When a sequential pattern having a minimum support value of 2 is extracted from such a provisional workflow, a workflow set 1902 that includes two workflows, task 1→task 2→task 3 and task 1→task 4, can be obtained. This extracted sequential pattern excludes sequences that will be subsequences of other sequential patterns. Such a sequential pattern is referred to as a closed sequential pattern.

Figure 6:
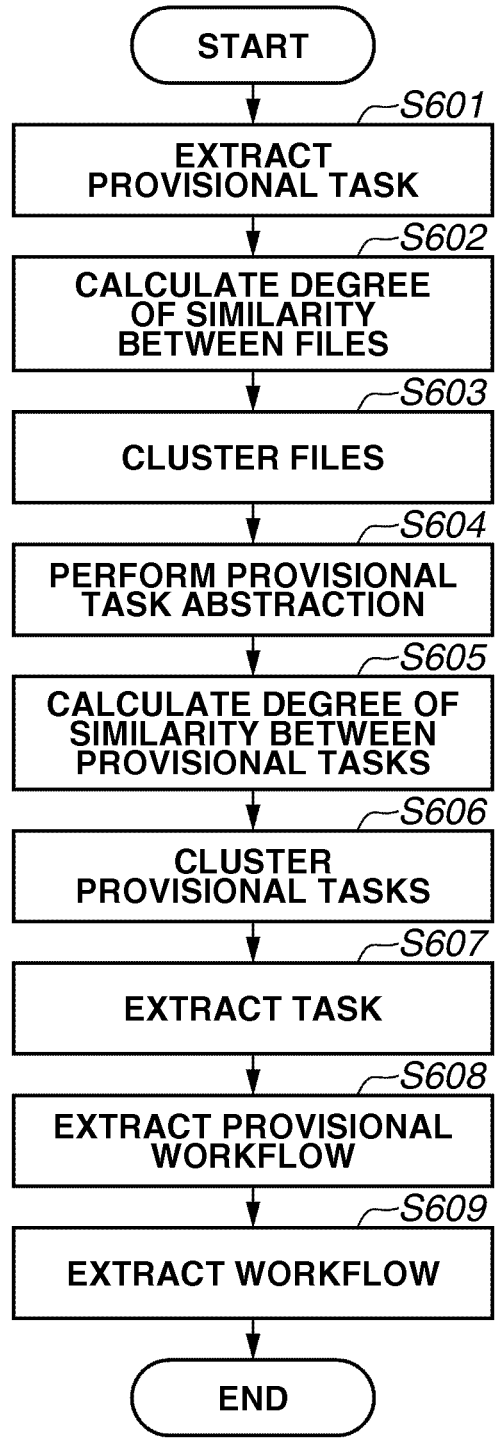
FIG. 6 is a flowchart illustrating workflow extraction according to an exemplary embodiment.
Figure 20:
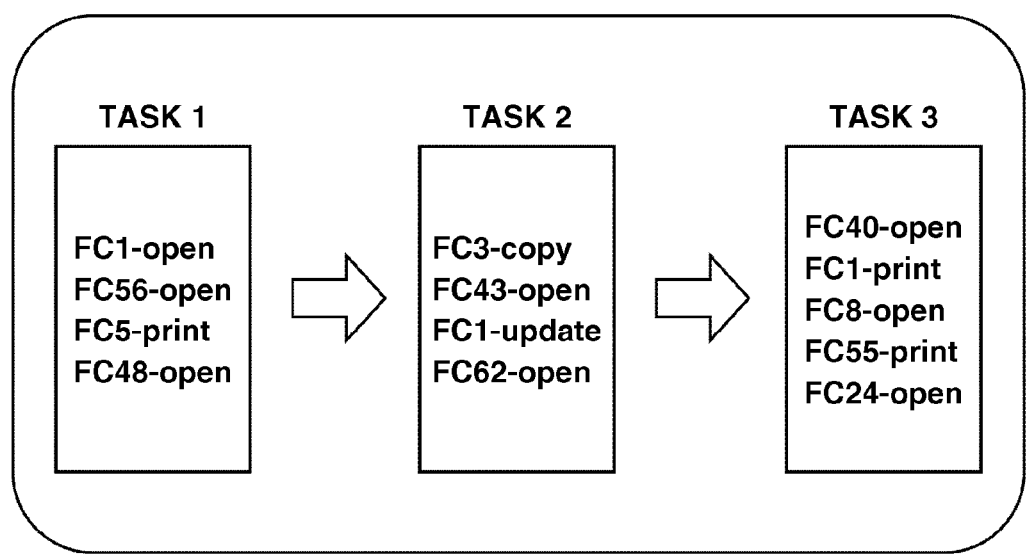
FIG. 20 illustrates a workflow according to an exemplary embodiment.

The workflow extraction processing performed by the workflow extraction unit 309 was described above based on the flowchart illustrated in steps S601 to S609 of FIG. 6. In this processing, a workflow is obtained by defining a meaningful predetermined set formed from a plurality of file operations as a task, and sequentially arranging tasks. FIG. 20 illustrates a concept of the workflow that is ultimately extracted.

The method for extracting a frequent pattern according to the present invention was described above based on an exemplary embodiment in which a workflow is extracted from a file operation history in a file management system. Thus, in the present exemplary embodiment, differences in document names or the usage order are assimilated so that a more versatile workflow can be extracted. The extracted workflow can be utilized to improve work efficiency. For example, such a workflow can be widely utilized, as it is useful in visualizing and re-examining work, can be referred to when building a workflow system, and can be used to make a file recommendation by navigating through a user's file operations.

An exemplary embodiment of a frequent pattern extraction method and an item recommendation method will now be described based on the drawings. In a second exemplary embodiment, a file having a folder (or a directory) structure serves as an item, and an item recommendation function as well as an item operation recommendation function are provided by adding a function to the file management system of the first exemplary embodiment.

The system configuration examples and the configuration examples of the respective devices in the present exemplary embodiment are the same as those in the first exemplary embodiment. However, although a file serves as an item in the present exemplary embodiment, the present invention is not limited to that. For example, for a device such as a digital camera or application software on a personal computer (PC), an operation menu or a setting can serve as the item. Thus by applying the present exemplary embodiment, navigation of that operation can be effectively performed.

FIG. 10 is a block diagram illustrating the blocks that perform the processing executed in the present exemplary embodiment. Except for some of the units in the file management system 1001, the units and the processing performed by those units are as described in the first exemplary embodiment. For example, similar to the workflow extraction unit 309, a workflow extraction unit 1006 extracts a workflow from the operation history based on the procedures of steps S601 to S609.

In the present exemplary embodiment, a characteristic feature is the addition of a file operation recommendation unit 1004 that includes an item recommendation function. Further, although in the present exemplary embodiment an item recommendation function and the like are incorporated in the file management system, the present invention is not limited to this. Each function may be executed by itself, or can be executed by incorporating it in another separate system. Further, although the present exemplary embodiment is described based on a client server model as the file management system, the present invention is not limited to this. Obviously, the present exemplary embodiment can also be executed by a stand-alone client.

The file operation recommendation unit 1004, which includes a workflow estimation unit 1005, estimates which of the workflows obtainable from the operation history a user's current file operation fits into, and recommends the file to be operated on next based on the estimated workflow. Further, the file operation recommendation unit 1004 also recommends a file operation. The recommended file and the file operation information are transmitted to a user terminal 1002 via an information transmission unit 1003. A client tool on the user terminal 1002 displays the recommended file operation information transmitted from the file management system 1001.

Next, the method for recommending a file and the method for recommending a file operation based on a workflow extracted by the file operation recommendation unit 1004 will be described. The file operation recommendation unit 1004, which includes the workflow estimation unit 1005, estimates which of the workflows obtainable from the operation history a user's most recent file operation fits into. Then, based on the estimated workflow, the file operation recommendation unit 1004 makes a recommendation to the user about the next file as well as a file operation.

Figure 21:
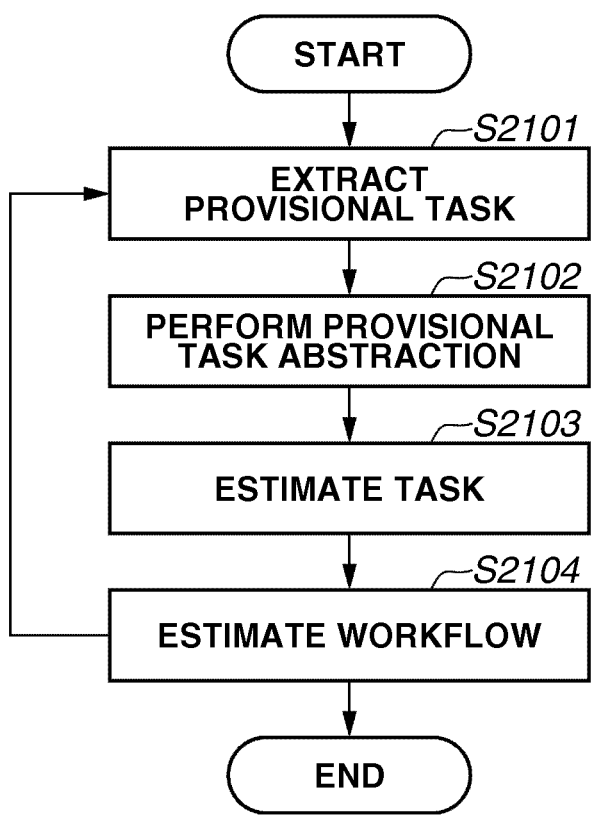
FIG. 21 is a flowchart illustrating workflow estimation according to an exemplary embodiment.

First, the processing performed by the workflow estimation unit 1005 will be described with reference to FIG. 21. This flowchart is realized by the control unit 201 executing a control program.

Figure 22:
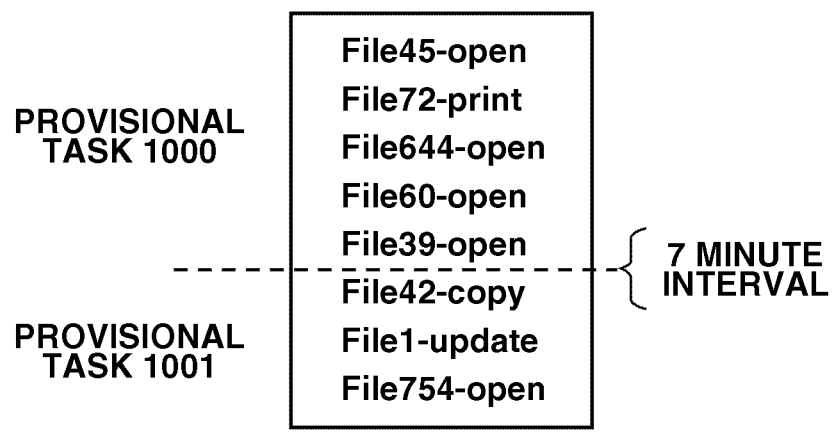
FIG. 22 illustrates provisional task extraction for workflow estimation according to an exemplary embodiment.

In step S2101, n number of the most recent file operations by a user are received as an input, and a provisional task is extracted by the workflow extraction unit 1006 based on the same method as in step S601. For example, if eight file operation histories such as those as illustrated in FIG. 22 are input, two provisional tasks, provisional task 1000 and provisional task 1001, are extracted.

Figure 23:
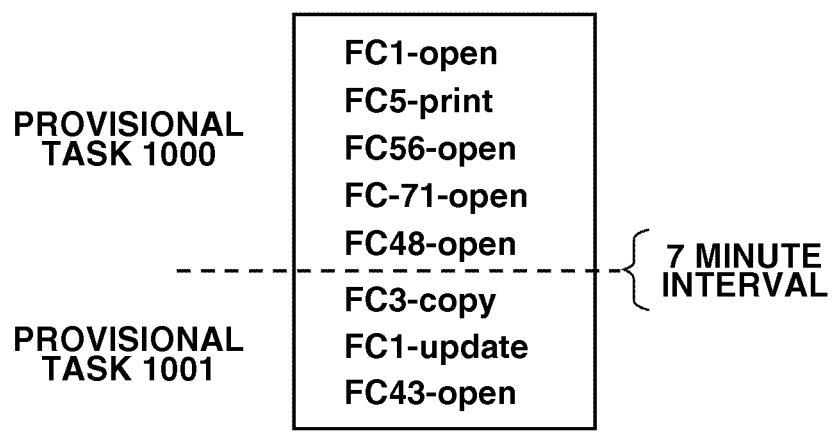
FIG. 23 illustrates provisional task abstraction for workflow estimation according to an exemplary embodiment.

In step S2102, provisional task abstraction is performed. Utilizing a file cluster created in step S603 by the workflow extraction unit 1006, provisional task abstraction is performed in the same manner as in step S604. Then, as illustrated in FIG. 23, provisional task 1 and provisional task 2 that have been abstracted into file cluster operations are obtained.

Figure 24:
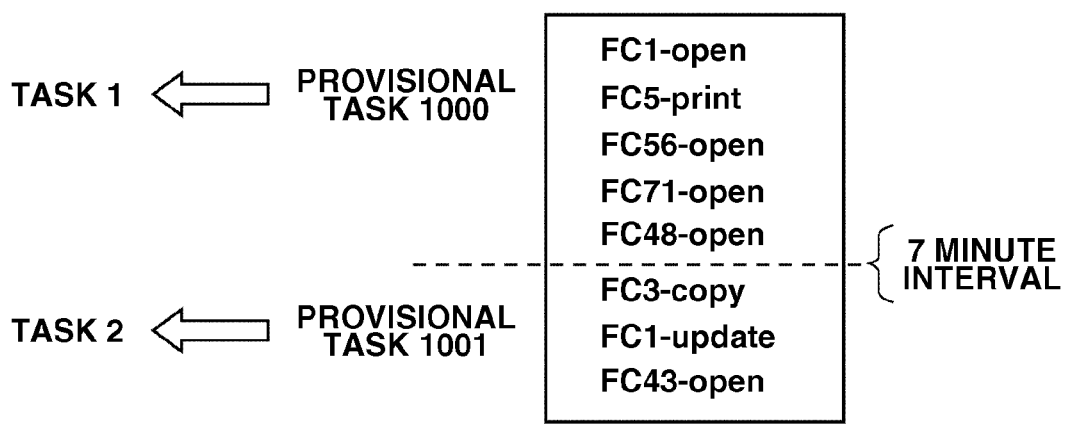
FIG. 24 illustrates task estimation for workflow estimation according to an exemplary embodiment.

In step S2103, a degree of similarity between the abstracted provisional tasks and the tasks extracted from the operation histories by the workflow extraction unit 1006 is calculated, and similar tasks are estimated. The method for calculating the degree of similarity is the same as that in step S605 by the workflow extraction unit 1006. Consequently, as illustrated in FIG. 24, the provisional task 1000 and the provisional task 1001 are estimated to be tasks 1 and task 2, respectively.

Figure 18:
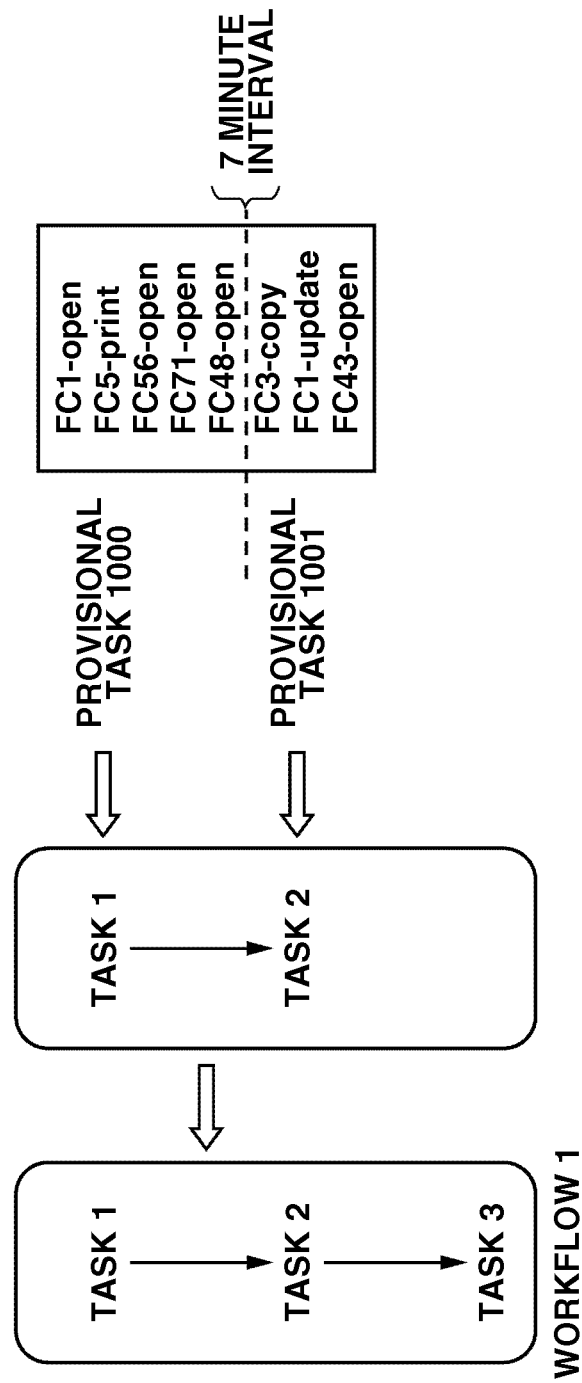
FIG. 18 illustrates workflow estimation according to an exemplary embodiment.

In step S2104, estimation is made regarding which of the workflows obtainable from the operation histories a sequence of the estimated tasks fits into. The estimate may be performed simply by estimating that a workflow with a high degree of match with the sequence is the workflow that the user is currently performing. Further, in addition to a matching degree, priority may be given to a workflow having a long subsequence length remaining behind the current task, or to a workflow having a high workflow appearance frequency. Ultimately, as illustrated in FIG. 18, the estimation result is workflow 1, which matches the sequence from task 1→task 2.

The workflow estimation unit 1005 has been described above using the flowchart illustrated in FIG. 21.

Figure 15:
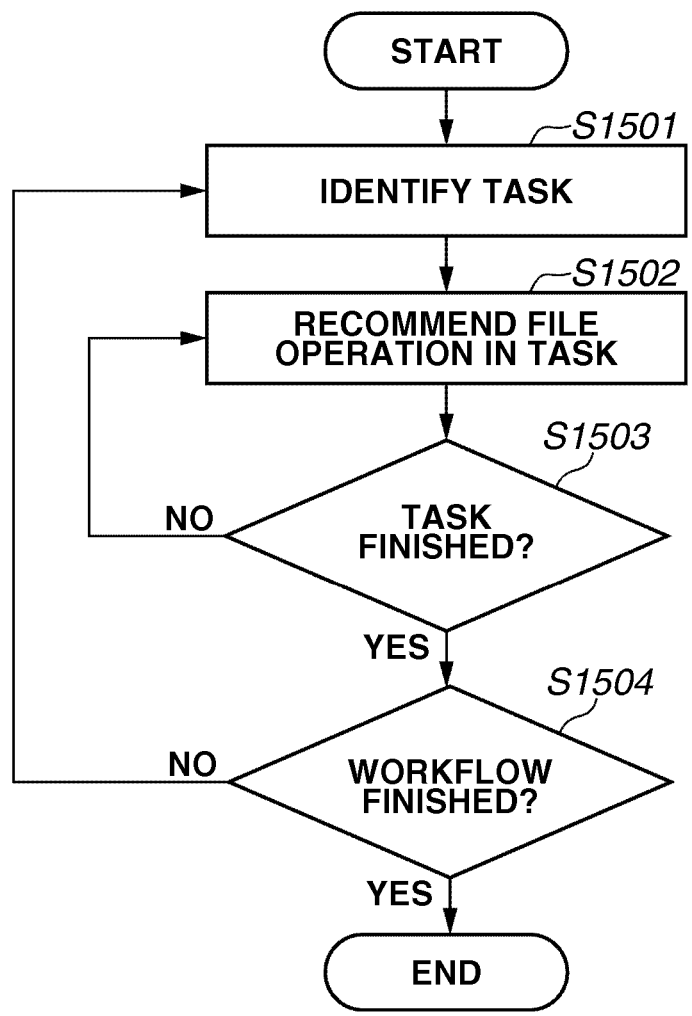
FIG. 15 is a flowchart illustrating file operation recommendation according to an exemplary embodiment.

Next, the processing for recommending to the user a file as well as a file operation thereof using the workflow estimated by the workflow estimation unit 1005 will be described with reference to FIG. 15. This flowchart is realized by the control unit 101 executing a control program.

In step S1501, the user's current task in the estimated workflow is specified. As illustrated in FIG. 18, the user's current task is specified as task 2.

In step S1502, a file operation in the specified task not yet performed by the user is recommended. Since the task is configured from an abstracted file cluster rather than specific file operations, when actually recommending a file operation, a conversion needs to be made from the file cluster into specific files.

Specifically, although a file cluster operation not yet performed by the user in the specified task 2 opens the files included in a file cluster 62, it is desirable to specify or rank which of the files included in the file cluster 62 are to be opened.

An example of this method is to make a determination in the file cluster based on the order of recent access, the order of higher access frequency, the frequency of use together with the file most recently opened by that user and the like. Obviously, the recommendation may be made to open any one of the files by presenting all of the files included in the file cluster 62.

In step S1503, it is determined whether the user has performed all of the file cluster operations in the specified task. If it is determined that there is a remaining file cluster operation (NO in step S1503), the processing returns to step S1502. If it is determined that all of the file cluster operations have been completed (YES in step S1503), the processing proceeds to step S1504.

In step S1504, it is determined whether the user has performed all of the tasks in the estimated workflow. If it is determined that there is a remaining task (NO in step S1504), the processing returns to step S1501. If it is determined that all of the tasks have been completed (YES in step S1504), recommendation of a file operation regarding to that workflow is finished.

The processing for recommending a file operation to the user performed by the file operation recommendation unit 1004 has been described above with reference to FIG. 15. Obviously, the system can be configured so that it automatically performs a file operation without recommending a file operation.

The frequent pattern extraction and recommendation system according to the present invention was described above based on an exemplary embodiment in which a workflow is extracted from a file operation history in a file management system, and a recommendation is made regarding a file operation using the extracted workflow. Thus, differences in document names or the usage order are assimilated so that a more versatile workflow can be extracted. Further, by using such a workflow, work efficiency, such as navigation through a user's file operations, can be increased.

The objective of the present invention can also be achieved by supplying a computer-readable storage medium, on which the software program code for realizing the functions of the above exemplary embodiments is stored, to a system or an apparatus. Further, it can be achieved by having a computer (or a CPU or a micro processing unit (MPU)) of the system or apparatus read and execute the program code stored on the storage medium.

In this case, the program code itself read from the storage medium realizes the functions of the above exemplary embodiments, so that the storage medium which stores the program code constitutes the present invention.

Examples of storage media for supplying the program include a flexible disk, a hard disk, an optical disc, a magneto optical disk (MO), a compact disc read-only memory (CD-ROM), a CD-recordable (CD-R), a non-volatile memory card, a ROM and the like.

Further, the present invention also includes embodiments where, for example, based on an instruction from a program code read by a computer, the operating system (OS) or the like running on the computer performs part or all of the actual processing, and by that processing the functions of the above-described exemplary embodiments are realized.

According to the present invention, differences in document names or the usage order are assimilated, so that a versatile workflow can be extracted. Using this workflow, an item or even an item operation can be recommended to a user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-003368 filed Jan. 11, 2012, which is hereby incorporated by reference herein in its entirety.

What is claimed is:

1. A frequent pattern extraction apparatus comprising:
an acquisition unit configured to acquire time series data for a data operation in user units from a data operation history database;
a dividing unit configured to divide the time series data for the data operation into a plurality of data operation sets;
a set degree of similarity acquisition unit configured to acquire a set degree of similarity among the plurality of data operation sets;
a generation unit configured to generate an abstract data operation set from the plurality of data operation sets using the set degree of similarity; and
an extraction unit configured to extract a pattern of a sequence that frequently appears among sequences consisting of the plurality of abstract data operation sets.

2. The frequent pattern extraction apparatus according to claim 1, wherein the dividing unit is configured to divide the time series data for the data operation into the plurality of data operation sets at fixed time intervals.

3. The frequent pattern extraction apparatus according to claim 1, wherein the dividing unit is configured to divide the time series data for the data operation into the plurality of data operation sets at locations where a time between data operations is equal to or more than a fixed duration.

4. The frequent pattern extraction apparatus according to claim 1, further comprising:
a data degree of similarity acquisition unit configured to calculate a data degree of similarity among the data; and
a clustering unit configured to cluster data using the data degree of similarity,
wherein the plurality of data operation sets are clustered into cluster units by the clustering unit.

5. The frequent pattern extraction apparatus according to claim 4, wherein the data degree of similarity is acquired using a copy history among the data.

6. The frequent pattern extraction apparatus according to claim 4, wherein the data degree of similarity is acquired using a data name of the data.

7. The frequent pattern extraction apparatus according to claim 1, further comprising:
   a determination unit configured to determine the abstract data operation set similar to a data operation set obtained by dividing time series data for a most recent data operation by a user by using the set degree of similarity; and
   a recommendation unit configured to recommend data to the user by using a pattern of sequences to which the determined abstract data operation set belongs.

8. The frequent pattern extraction apparatus according to claim 7, wherein a data operation is recommended by the recommendation unit.

9. A method for extracting a frequent pattern comprising:
   acquiring time series data for a data operation in user units from a data operation history database;
   dividing the time series data for the data operation into a plurality of data operation sets;
   acquiring a set degree of similarity among the data operation sets;
   generating an abstract data operation set from the plurality of data operation sets using the set degree of similarity; and
   extracting a pattern of a sequence that frequently appears among sequences consisting of the plurality of abstract data operation sets.

10. A non-transitory storage medium in which a computer program is stored, the program, when executed by a computer, causes the computer to perform a method for extracting a frequent pattern, the method comprising:
    acquiring time series data for a data operation in user units from a data operation history database;
    dividing the time series data for the data operation into a plurality of data operation sets;
    acquire a set degree of similarity among the plurality of data operation sets;
    generating an abstract data operation set from the data operation sets using the set degree of similarity; and
    extracting a pattern of a sequence that frequently appears among sequences consisting of the plurality of abstract data operation sets.

* * * * *